Dec. 8, 1931.   J. F. O'CONNOR   1,835,177
HAND BRAKE
Filed Oct. 1, 1927
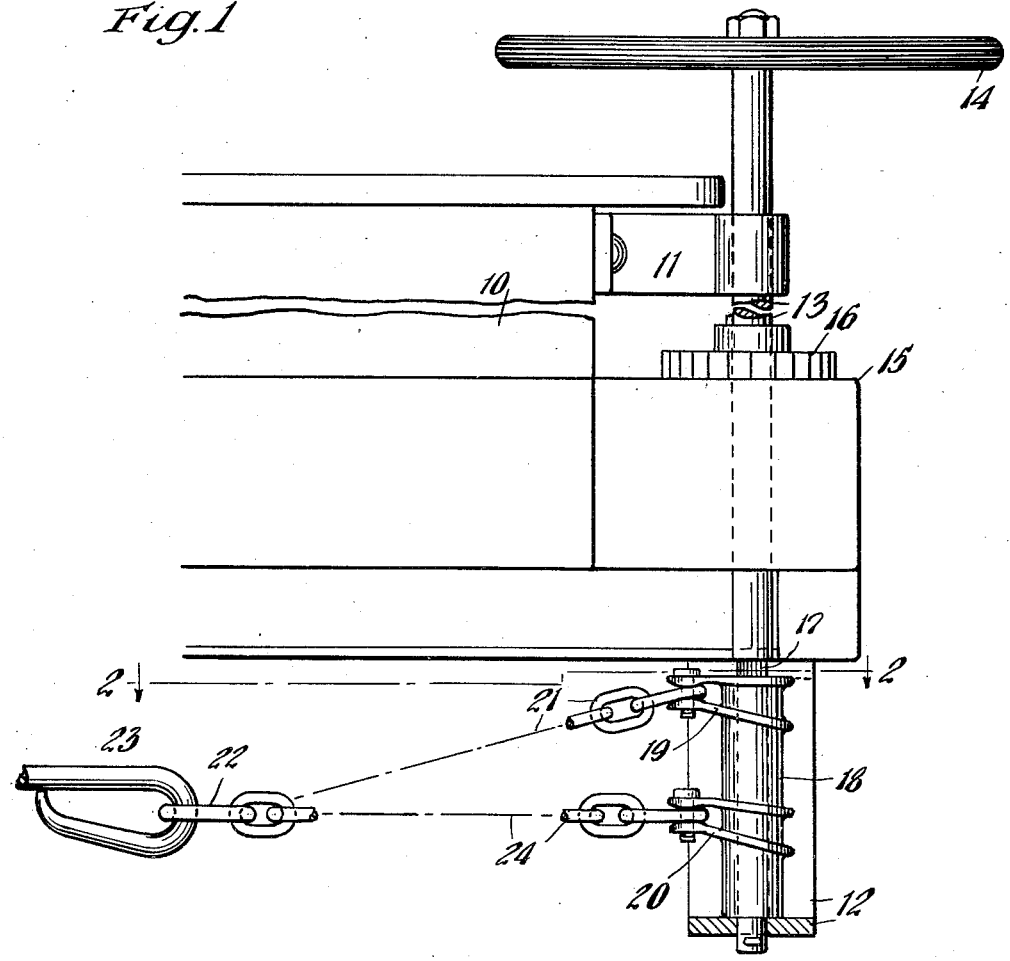
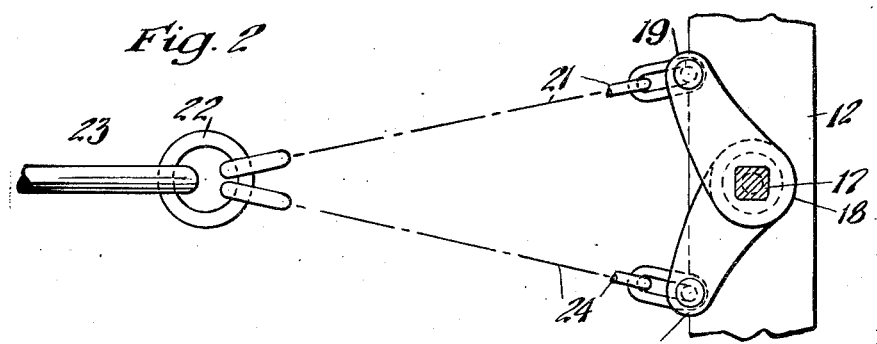
Inventor
John F. O'Connor
By George I. Haight
His Atty.
Witness
Wm. Geiger Patented Dec. 8, 1931

1,835,177

UNITED STATES PATENT OFFICE

JOHN F. O'CONNOR, OF CHICAGO, ILLINOIS, ASSIGNOR TO W. H. MINER INC., OF CHICAGO, ILLINOIS, A CORPORATION OF DELAWARE

HAND BRAKE

Application filed October 1, 1927. Serial No. 223,271.

This invention relates to hand brakes.

An object of the invention is to provide a hand brake mechanism, including a rotatable winding staff adapted to be connected by rigging to the brake shoes proper, and wherein means in the form of radially extending arms are provided on said staff in conjunction with a connecting element extending from each of said arms and connected to said brake rigging, whereby said staff and said arms are maintained in predetermined position, in the released condition of the brake, and are disposed at the most efficient angle to effect a quick-take-up of the brake rigging immediately the brake winding operation is initiated, the staff and arms being automatically returned to initial predetermined position when the brake is released.

Other and further objects of the invention will more clearly and fully appear from the description and claims hereinafter following.

In the drawings forming part of this specification, Figure 1 is a broken side elevational view of a portion of a railway car, showing the invention applied thereto. And Figure 2 is a horizontal sectional view of the invention corresponding to the line 2—2 of Figure 1, and showing parts of the mechanism in top plan.

As shown in the drawings, 10 indicates an end portion of a railway car, to the upper end of which is secured a bracket 11, and on the lower end of which is mounted a stirrup 12. The brake staff, indicated at 13, is rotatably mounted in the bracket 11, and has its lower cylindrical end rotatably mounted in the stirrup 12 in the usual manner. The upper end of the staff is provided with a hand wheel by means of which the staff is rotated. The staff 13 is equipped with the usual pawl and ratchet mechanism 16 for preventing retrograde rotation.

The lower end of the staff 13 has a portion 17 square in cross section, upon which is nonrotatably mounted a winding drum 18. Formed integrally with the winding drum are longitudinally spaced laterally extending arms 19 and 20, said arms extending radially with reference to said drum and being disposed at angles of approximately 120 degrees with respect to said drum and each other, although said angles may be slightly greater or less, as desired, the angles shown being deemed preferable.

The arm 19 is made up of spaced members preferably converging from their outer ends toward the drum 18 as shown in Figure 1, and between the outer ends of the members forming the arm 19 is secured one end of a connecting chain portion 21, the opposite end of the portion 21 being connected to a ring 22 secured to a loop 23 on the brake rod. The arm 20 is of the same character as the arm 19 and the members of which the arm 20 is formed have their outer ends connected by a chain portion 24 to the ring 22, the chain portions 21 and 24 being of such length as to hold the ends of the arms 19 and 20 on opposite sides of a direct line extending through the center of the staff 13 and the loop 23 of the brake rigging.

In operation, the normal position of the brake staff and the arms 19 and 20 is best shown in Figure 2, and said staff is held in this position due to the pull of the brake shoes upon the two chain portions 21 and 24, which are connected to the outer ends of the arms 19 and 20, and exert equal force thereupon, serving to hold the brake staff in such position that the arms 19 and 20 are disposed upon each side of a line extending from the center of the brake staff 13 to the loop 23 on the brake rod, and due to this disposition of the arms, assuming initial winding of the staff 13 in a clock-wise direction, the arm 19, being disposed on one side of the center of the brake staff, will immediately function in taking up the connecting portion 21, setting the brakes, the connecting portion 24 of course becoming slack and subsequently being wound upon the drum 18.

The two arms 19 and 20 are provided to meet rotation of staff in either direction automatically; rotation of the staff in a counterclockwise direction causes the arm 20 to take in the connecting portion 24, while the portion 21 becomes slack and winds on the drum 18. When the brake staff 13 is released through disconnection of the pawl mechanism 16, under the pull of the brake rod and brake shoes exerted upon the connections 21 or 24, the staff 13, and the arms 19 and 20 will be returned to the initial position and maintained in such condition until the brake staff is again rotated in either direction to take up the brake chain.

While I have herein shown and described what I consider the preferred manner of carrying out the invention, the same is merely illustrative, and I contemplate all changes and modifications which come within the scope of the claims appended hereto.

I claim:

1. In a hand brake of the character described the combination with a rotatable element, and brake rigging; of radially disposed extensions rigidly affixed to said brake staff, said extensions being disposed at an angle to each other; and connecting portions, one of which extends from the outer end of one of said extensions to said brake rigging, and the other of which extends from the outer end of the other of said extensions to said brake rigging, said connecting portions being of such length as to normally maintain said arms at opposite sides of a line extending directly from the center of said element to the point of application of force by said brake rigging.

2. In a hand brake of the character described, the combination with a rotatable member having radially disposed arms projecting in different directions from the axis of rotation of said member; of a connection between one of said arms and the brake rigging; and means connected to the other arm actuated by the pull of the brake rigging when released for bringing said first named arm to a position at an angle to a line extending through the center of said staff and said brake rigging when said brake is in fully released condition to affect the maximum take-up of said rigging upon initiation of the brake winding operation.

3. In a hand brake mechanism, the combination with a rotatable staff; of longitudinally spaced radially disposed arms extending at an angle to each other and fixed to said staff; rigging adapted to be connected to the brake shoes proper; and connecting portions extending from the outer end of each of said arms to said rigging, said connecting portions being of such length as to normally maintain said arms in transversely disposed relation with respect to a line extending through said staff and the point of connection of said portions with said rigging.

4. In a hand brake mechanism, the combination with a rotatable staff upon which a brake tightening element is adapted to be wound; of a pair of radially disposed quick take-up arms spaced about the axis of rotation of the staff and projecting outwardly therefrom, said arms being rotatable with the staff; and separate means connecting the outwardly projecting portion of each of said arms with the tightening element, whereby take-up of said brake rigging is effected when the staff is rotated in either of opposite directions.

5. In a hand brake structure, the combination with a rotatable member and connecting elements between the brake shoes of the brake mechanism proper and said rotatable member, said elements being separately connected to said rotatable member at spaced points eccentric to the axis of rotation of said member and at opposite sides of said axis, whereby said rotatable member is maintained in predetermined position by the pull in opposite directions of said connecting elements when the brake is released, so that the points of connection of said elements with said rotatable member are disposed at opposite sides of a line extending directly from the center of rotation of said member to the point of application of the force to the brake shoes by said elements.

In witness that I claim the foregoing I have hereunto subscribed my name this 28th day of September, 1927.

JOHN F. O'CONNOR.